(12) United States Patent
Maharana et al.

(10) Patent No.: US 9,110,813 B2
(45) Date of Patent: Aug. 18, 2015

(54) CACHE LOAD BALANCING IN STORAGE CONTROLLERS

(71) Applicant: LSI CORPORATION, San Jose, CA (US)

(72) Inventors: Parag R. Maharana, Fremont, CA (US); Kishore K. Sampathkumar, Bangalore (IN)

(73) Assignee: Avago Technologies General IP (Singapore) Pte Ltd, Singapore (SG)

( * ) Notice: Subject to any disclaimer, the term of this patent is extended or adjusted under 35 U.S.C. 154(b) by 206 days.

(21) Appl. No.: 13/766,985

(22) Filed: Feb. 14, 2013

(65) Prior Publication Data

US 2014/0229658 A1    Aug. 14, 2014

(51) Int. Cl.
*G06F 12/00*    (2006.01)
*G06F 12/08*    (2006.01)

(52) U.S. Cl.
CPC ...... *G06F 12/0866* (2013.01); *G06F 2212/222* (2013.01); *G06F 2212/262* (2013.01); *G06F 2212/283* (2013.01)

(58) Field of Classification Search
CPC .......... G06F 12/0866; G06F 2212/222; G06F 2212/262; G06F 2212/283
USPC .......................................... 711/103, 113, 114
See application file for complete search history.

(56) References Cited

U.S. PATENT DOCUMENTS

| | | | |
|---|---|---|---|
| 7,117,311 B1 | 10/2006 | Rankin et al. | |
| 7,948,798 B1 * | 5/2011 | Sheredy et al. | 365/185.11 |
| 8,010,738 B1 | 8/2011 | Chilton et al. | |
| 8,046,551 B1 | 10/2011 | Sahin | |
| 8,145,893 B2 | 3/2012 | Narayanan | |
| 8,261,145 B2 * | 9/2012 | Choi et al. | 714/748 |
| 8,321,597 B2 | 11/2012 | Yu et al. | |
| 2003/0200388 A1 * | 10/2003 | Hetrick | 711/114 |
| 2004/0024941 A1 * | 2/2004 | Olarig et al. | 710/302 |
| 2006/0004957 A1 * | 1/2006 | Hand et al. | 711/113 |
| 2006/0075191 A1 * | 4/2006 | Lolayekar et al. | 711/114 |
| 2013/0275672 A1 * | 10/2013 | Bert | 711/114 |

OTHER PUBLICATIONS

"Solid State Revolution: in-depth on how SSDs really work," The SSD Revolution/An ARS Technica Feature. Downloaded Dec. 19, 2012 from URL: arstechnica.com/information-technology/ . . . /indside-the-ssd-revolution-how-solid-state-disks-really-work/.
U.S. Appl. No. 13/761,608.

* cited by examiner

*Primary Examiner* — Larry MacKall
(74) *Attorney, Agent, or Firm* — Duft Bornsen & Fettig

(57) ABSTRACT

Methods and structure are provided for cache load balancing in storage controllers that utilize Solid State Drive (SSD) caches. One embodiment is a storage controller of a storage system. The storage controller includes a host interface operable to receive Input and Output (I/O) operations from a host computer. The storage controller also includes a cache memory that includes an SSD. Further, the storage controller includes a cache manager that is distinct from the cache memory. The cache manager is able to determine physical locations in the multiple SSDs that are unused, to identify an unused location that was written to a longer period of time ago than other unused locations, and to store a received I/O operation in the identified physical location. Further, the cache manager is able to trigger transmission of the stored I/O operations to storage devices of the storage system for processing.

20 Claims, 8 Drawing Sheets

CACHE LOAD BALANCING IN STORAGE CONTROLLERS

FIELD OF THE INVENTION

The invention relates generally to storage systems and more specifically relates to caches for storage controllers of storage systems.

BACKGROUND

In many storage systems, a storage controller is used to translate Input/Output (I/O) operations from a host into the language of the storage system (e.g., Serial Attached Small Computer System Interface (SAS), Peripheral Component Interconnect Express (PCIe), etc.). The storage controller caches incoming commands before transmitting them to their intended destinations. Storage controllers often implement their caches with non-volatile, but also low-latency memories. One existing example of such memory technology is the Solid State Drive (SSD). SSDs are made up of multiple cells that each electrically store one or more bits of data. Each cell in the SSD is limited in the total number of writes that it can receive before it eventually fails. Therefore, an SSD can encounter a drop in performance if one section of its cells is written to more often than others. Some SSDs are enhanced to distribute incoming writes to different cells, thereby increasing the functional lifetime of the SSD as a whole. However, these SSDs are more expensive, and storage controllers are not automatically aware of whether their caches are implemented with enhanced SSDs or simple SSDs.

SUMMARY

The present invention addresses the above and other problems, thereby advancing the state of the useful arts, by providing methods and structure for a storage controller to actively balance I/O load at its cache. For example, the storage controller itself can cycle writes through different physical locations in an SSD cache to extend the operational life of the cache.

In one embodiment a storage controller of a storage system includes a host interface operable to receive Input and Output (I/O) operations from a host computer. The storage controller also includes a cache memory that includes a Solid State Drive (SSD). Further, the storage controller includes a cache manager that is distinct from the cache memory. The cache manager is able to determine physical locations in the multiple SSDs that are unused, to identify an unused location that was written to a longer period of time ago than other unused locations, and to store a received I/O operation in the identified physical location. Further, the cache manager is able to trigger transmission of the stored I/O operations to storage devices of the storage system for processing.

Other exemplary embodiments (e.g., methods and computer-readable media relating to the foregoing embodiments) are described below.

BRIEF DESCRIPTION OF THE FIGURES

Some embodiments of the present invention are now described, by way of example only, and with reference to the accompanying drawings. The same reference number represents the same element or the same type of element on all drawings.

DETAILED DESCRIPTION OF THE FIGURES

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
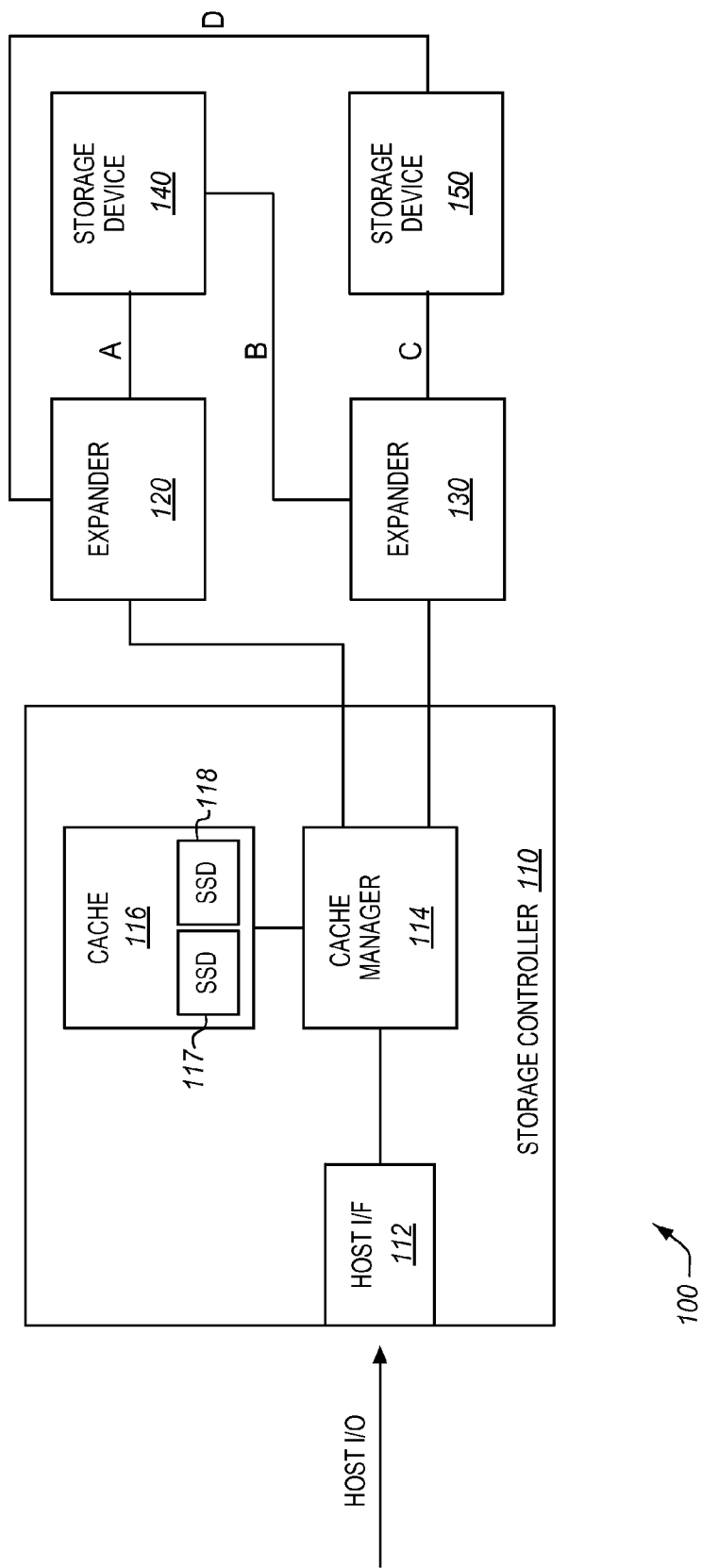
FIG. 1 is a block diagram of an exemplary storage system.

FIG. 1 is a block diagram of an exemplary storage system 100. In this embodiment, storage system 100 includes storage controller 110, which utilizes Solid State Drive (SSD) cache 116 (e.g., a non-volatile flash memory cache). Cache 116 is implemented by SSD 117 and SSD 118. Storage controller 110 has been enhanced to manage cache 116 to ensure longevity for each of SSDs 117 and 118. Thus, even if "simple" SSDs are used, storage controller 110 can keep cache 116 operating efficiently for a long period of time.

Storage controller 110 is any suitable device operable to manage a logical volume kept at one or more storage devices of storage system 100. For example, storage controller 110 may comprise a Serial Attached Small Computer System Interface (SAS)-compliant Host Bus Adapter (HBA). The HBA may manage multiple SAS or Serial Advanced Technology Attachment (SATA) storage devices that implement a Redundant Array of Independent Disks (RAID) volume and are coupled via one or more SAS expanders (e.g., expanders 120 and 130).

Storage controller 110 includes host interface (I/F) 112, cache manager 114, and cache 116. Host I/F 112 receives incoming I/O operations from a host for processing. Cache manager 114 acquires the incoming I/O from host I/F 112, and caches I/O in cache 116 before performing the operations requested by the host. In one embodiment, cache manager 114 translates the I/O received from the host before caching the I/O. For example, cache manager 114 may generate multiple RAID commands for caching, based on a single received host I/O request. Cache manager 114 is distinct from SSDs 117 and 118. This means that cache manager 114 is not a controller that is internal to an SSD or otherwise integrated into an SSD. Cache manager 114 is separate from any SSD controllers that may reside in SSDs 117 and 118. The SSD controller within each SSD may include its own logic to manage the way that writes are applied to physical addresses for each of one or more physical storage components within the SSD.

Cache manager 114 may be implemented as custom circuitry, as a special or general purpose processor executing programmed instructions stored in an associated program memory, or some combination thereof.

In one embodiment, SSDs 117 and 118, which implement cache memory 116, comprise non-volatile SSD memory, such as flash memory. The SSDs utilize non-volatile memory in this embodiment in order to prevent data loss if a power failure occurs at storage controller 110.

I/O stored in cache 116 is eventually sent out to storage devices 140 and 150 via expanders 120 and/or 130 (e.g., SAS expanders). In this embodiment the communication pathways (A-D) used by the expanders to send I/O to the storage devices are redundant. This ensures that if a given signaling pathway is broken or unavailable, a storage device can still be contacted using an alternate pathway. The combination of expanders and communication pathways is referred to herein as a switched fabric. The switched fabric may comprise any suitable combination of communication channels for forwarding communications. For example, the switched fabric may implement protocols for one or more of SAS, Fibre-Channel, Ethernet, Internet Small Computer System Interface (ISCSI), etc.

Storage devices 140 and 150 implement the storage capacity for one or more logical volumes of storage system 100 (e.g., RAID logical volumes), and may comprise any media and/or interfaces capable of storing and/or retrieving data in a computer-readable format. For example, storage devices 140 and 150 may comprise magnetic hard disks, solid state drives, optical media, etc. The number of storage devices utilized by storage system 100 may vary as a matter of design choice.

Note that the particular arrangement of components described herein is merely intended to be exemplary, and one of ordinary skill in the art will appreciate that the specific arrangement and configuration of storage system devices is merely a matter of design choice.

Figure 2:
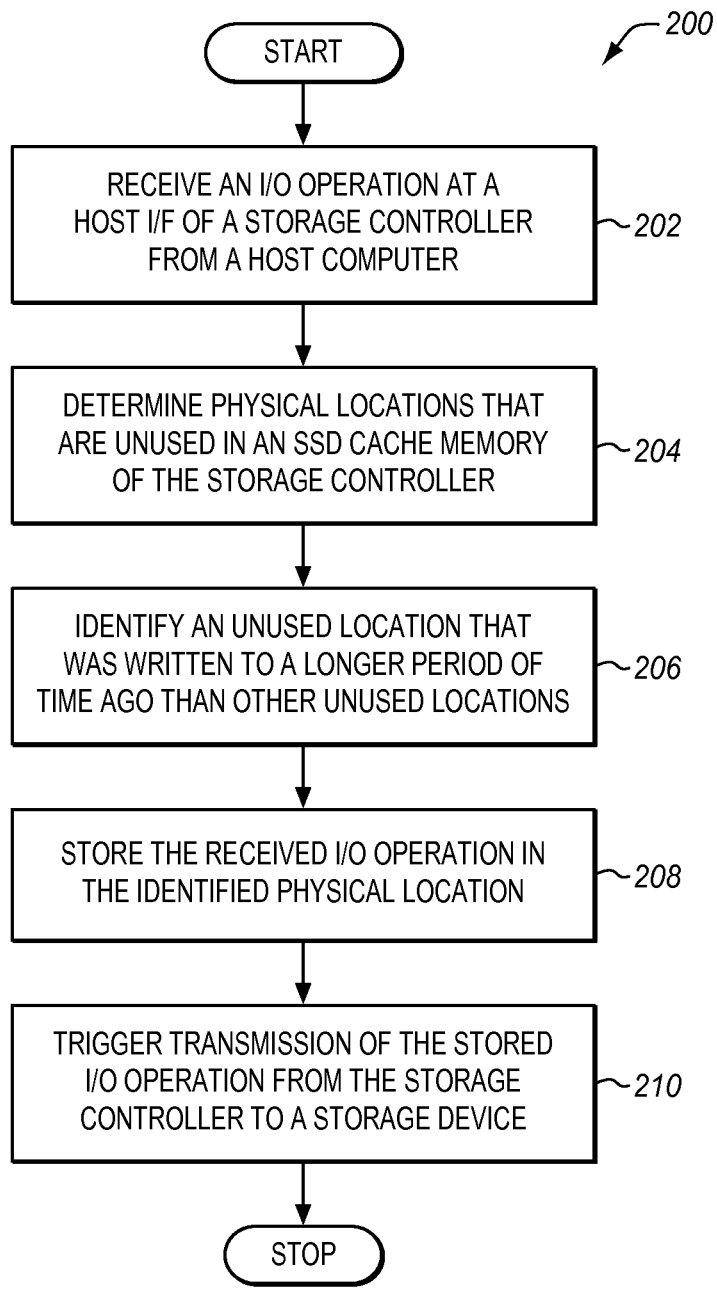
FIG. 2 is a flowchart describing an exemplary method to manage cache memory of a storage controller of a storage system.

Further details of the operation of storage system 100 will be described with regard to FIG. 2 below. Assume, for this embodiment, that storage controller 110 is actively managing and caching I/O operations received from one or more hosts that are directed to one or more logical volumes of storage system 100. FIG. 2 is a flowchart describing an exemplary method 200 to manage cache memory of a storage controller of a storage system while processing these I/O operations.

In step 202, storage controller 110 receives an I/O operation from a host computer via host I/F 112. I/O operations can be any of various read and/or write commands directed to a logical volume managed by the storage controller. In one embodiment cache manager 214 additionally re-formats, alters, or translates received host commands into a format supported by the storage system. For example, cache manager 214 can receive a single write command from a host, and then generate multiple I/O commands directed to different storage devices in order to stripe the data across a RAID volume.

In step 204, cache manager 114 of storage controller 110 determines a set of physical locations in cache memory that are currently unused. These physical locations may be blank, or may store old data that no longer is useful for cache 116. Cache manager 114 may determine unused locations by reviewing the cache to assemble a list of available locations on the fly, or by actively maintaining and updating a list of available physical locations as commands are cached and flushed from the cache for processing. The set of available physical locations are specific physical memory addresses (or similar components) that indicate specific physical locations in the cache memory. Thus, the set of available physical locations may indicate physical pages of SSD flash memory, or similar physical memory features.

In step 206, cache manager 114 identifies a location from the set that was written to a longer period of time ago than other locations in the set. In one embodiment cache manager 114 identifies a location in cache 116 that was written to the longest period of time ago. Identifying such a location may be performed by accessing actively maintained queues, tables, or other data structures that indicate a date or an order in which physical locations in cache 116 were written to. This table may be updated by cache manager 114 each time an incoming I/O operation is cached.

In step 208, cache manager 114 stores the I/O operations in the identified physical location, and in step 210, cache manager 114 triggers transmission of the cached I/O operation to one or more storage devices of storage system 100 for processing (i.e., the storage devices that implement the logical volume that the I/O operation is directed to). In one embodiment, this involves operating a physical link at storage controller 110 to transmit the cached I/O operation. When the cached I/O operation has been successfully processed, the physical location at cache 116 may be marked as free and available for receiving new I/O operations.

Using the steps of method 200, storage controller 110 may quickly and effectively ensure that physical locations in SSD cache memory are written to at approximately the same rate. Therefore, SSDs 117 and 118 can operate near peak efficiency for a longer period of time, even though they do not need to include any enhanced firmware logic.

Even though the steps of method 200 are described with reference to storage controller 110 of FIG. 1, method 200 may be performed in other systems. The steps of the flowcharts described herein are not all inclusive and may include other steps not shown. The steps described herein may also be performed in an alternative order.

Figure 3:
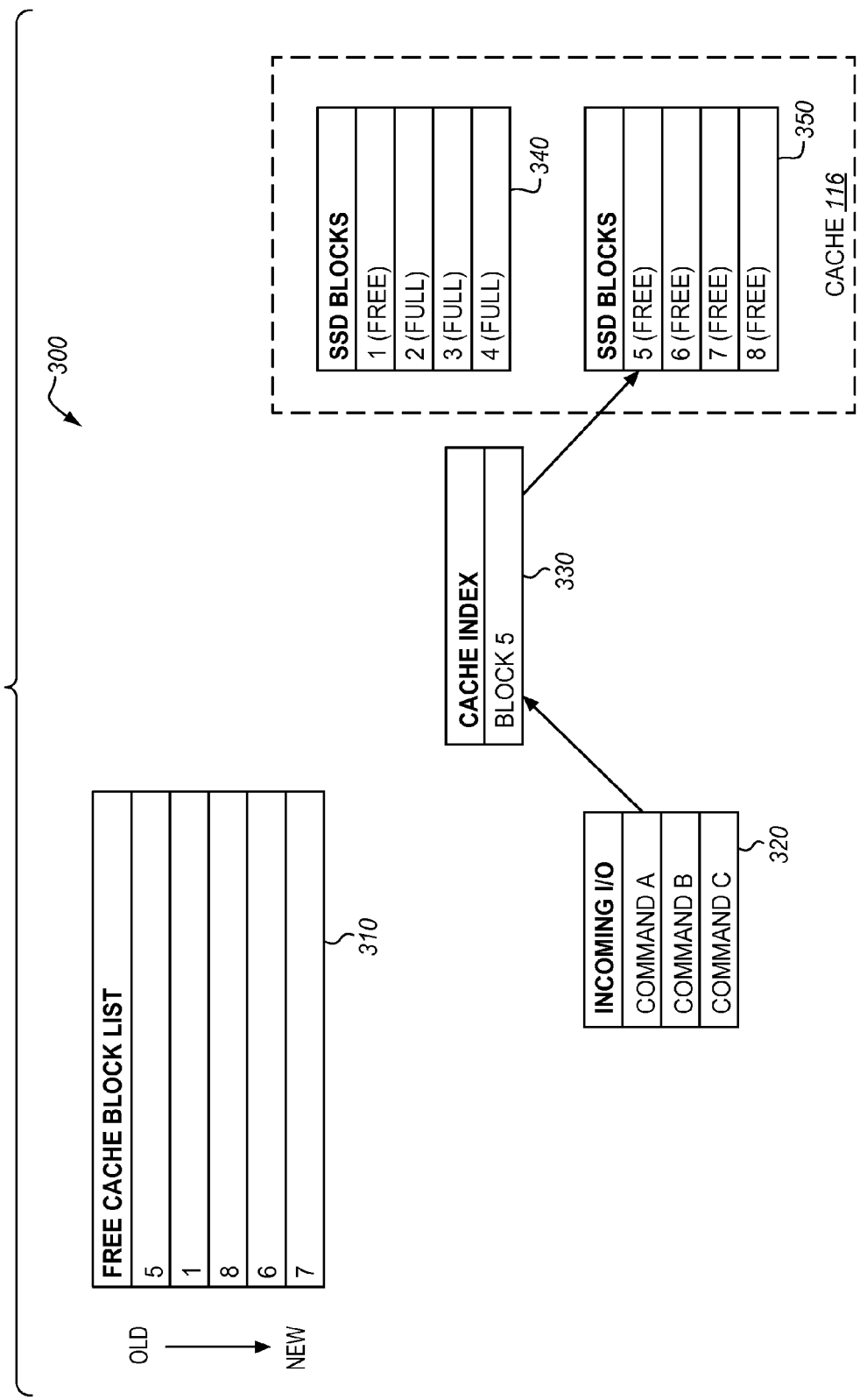
FIG. 3 is a block diagram illustrating an exemplary cache.
Figure 4:
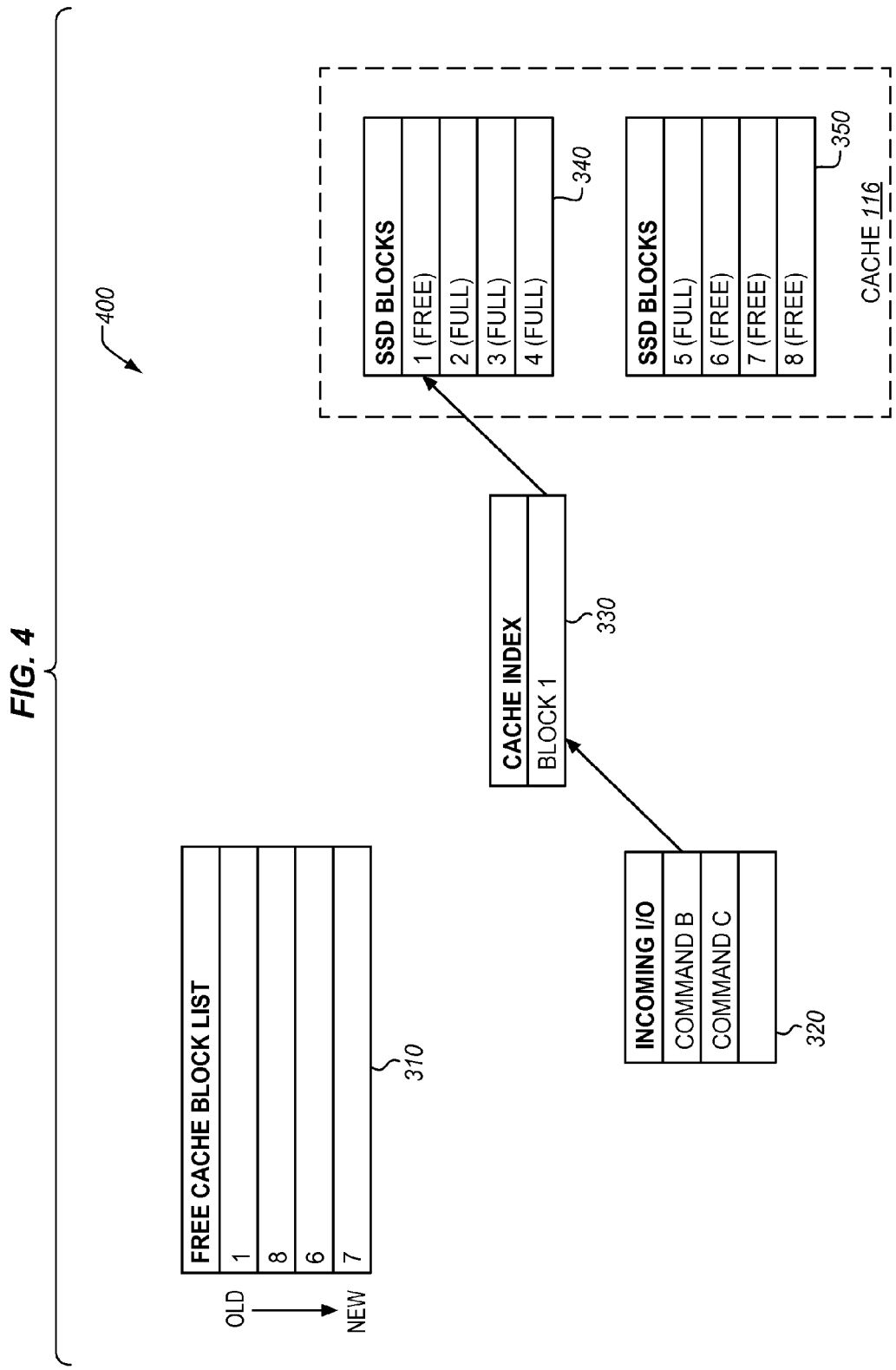
FIG. 4 is a block diagram further illustrating an exemplary cache.

FIGS. 3-4 illustrate an exemplary embodiment wherein cache 116 is updated using method 200 described above. According to block diagram 300 of FIG. 3, cache manager 114 of storage controller 110 maintains free cache block list 310 as a queue that indicates available physical locations 340 (corresponding to SSD 117) and available physical locations 350 (corresponding to SSD 118). Free cache block list 310 indicates each block in cache 116 that is free to be written to.

Cache manager 114 also maintains a cache index 330 that indicates the physical location that has been free for the longest period of time. By using index 330, cache manager 114 can quickly determine which cache block to write to next. Cache block list 310 and cache index 330 may be stored, for example, in battery backed-up Random Access Memory (RAM) that is independent from cache memory 116.

While in operation, storage controller 110 receives I/O from a host as indicated by table 320. Then, cache manager 114 caches the received I/O in the indexed cache location, and updates free cache block list 310 as well as cache index 330. When free cache block list 310 and cache index 330 have been updated, cache manager 114 is ready to cache a next command from the host. Thus, in FIG. 3, I/O command A is stored at SSD block 5.

FIG. 4 is a block diagram 400 further illustrating exemplary cache 116. In FIG. 4, free cache block list 310 has been updated, as has cache index value 330. Thus, when I/O command B is cached, it is cached at a new location that currently has been free for the longest period of time.

Figure 5:
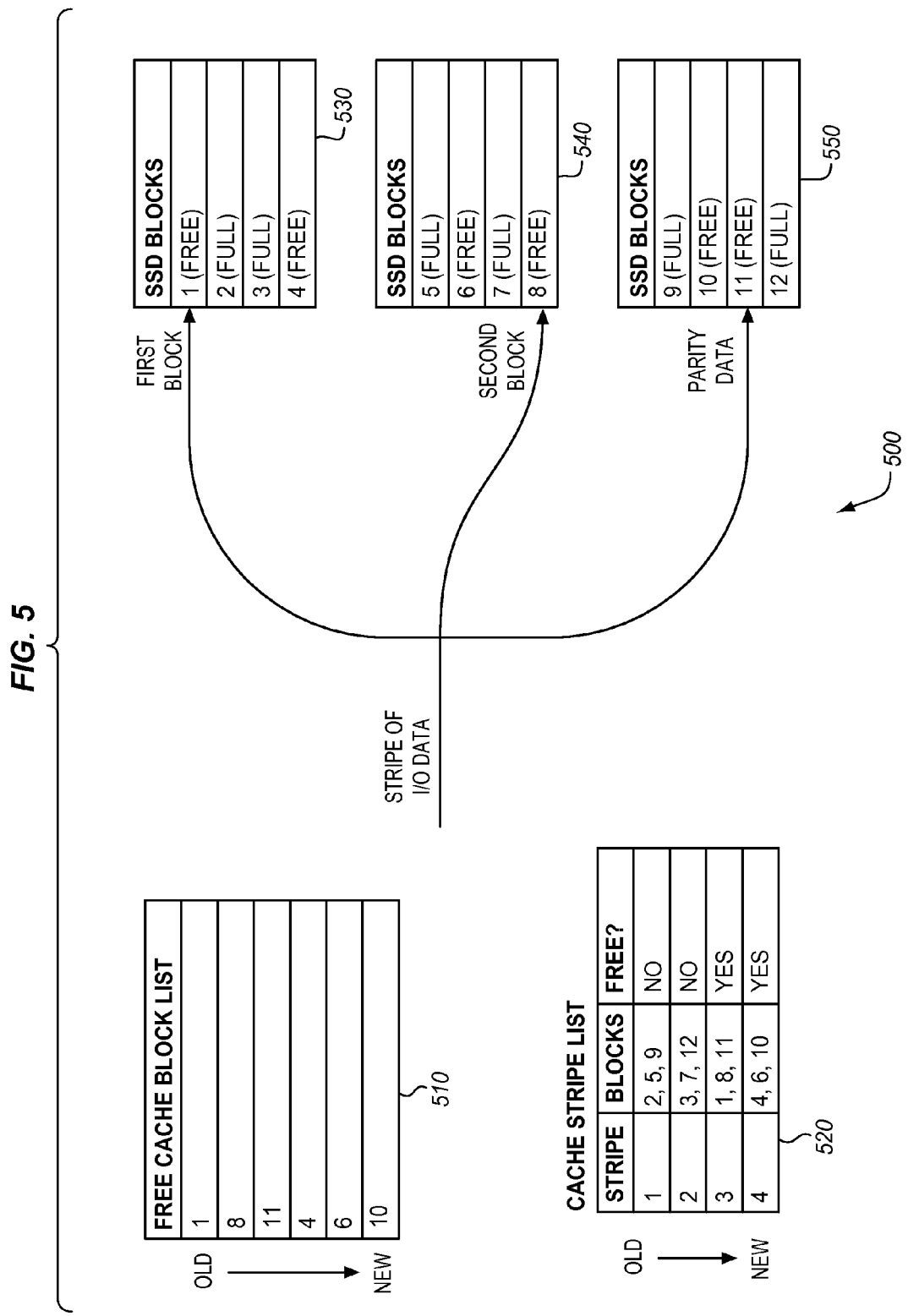
FIG. 5 is a block diagram illustrating another exemplary cache.

FIG. 5 is a block diagram 500 illustrating another exemplary cache embodiment where cache 116 of storage controller 110 is used to store incoming write commands for a striped RAID level 5 volume. In this embodiment, the cache memory includes three different SSDs (corresponding to the available physical locations indicated by 530, 540, and 550 respectively). The storage controller maintains a free cache block list 510, but also maintains a cache stripe list 520.

Cache stripe list 520 is used to indicate entire stripes of cache memory (here, three independent physical locations in cache memory) that can be written to at once in order to store a full stripe of I/O data. In this embodiment, cache stripe list 520 indicates stripes that are free for writing, as well as stripes that are currently filled with I/O data. The specific physical locations used to implement each stripe may be determined on the fly by a cache manager of the storage controller as new blocks of memory become available. In one embodiment, the blocks from each stripe are each written to a different SSD. In another embodiment, the blocks from each stripe are assembled in the order that they become free, regardless of the storage devices that implement the blocks.

Figure 6:
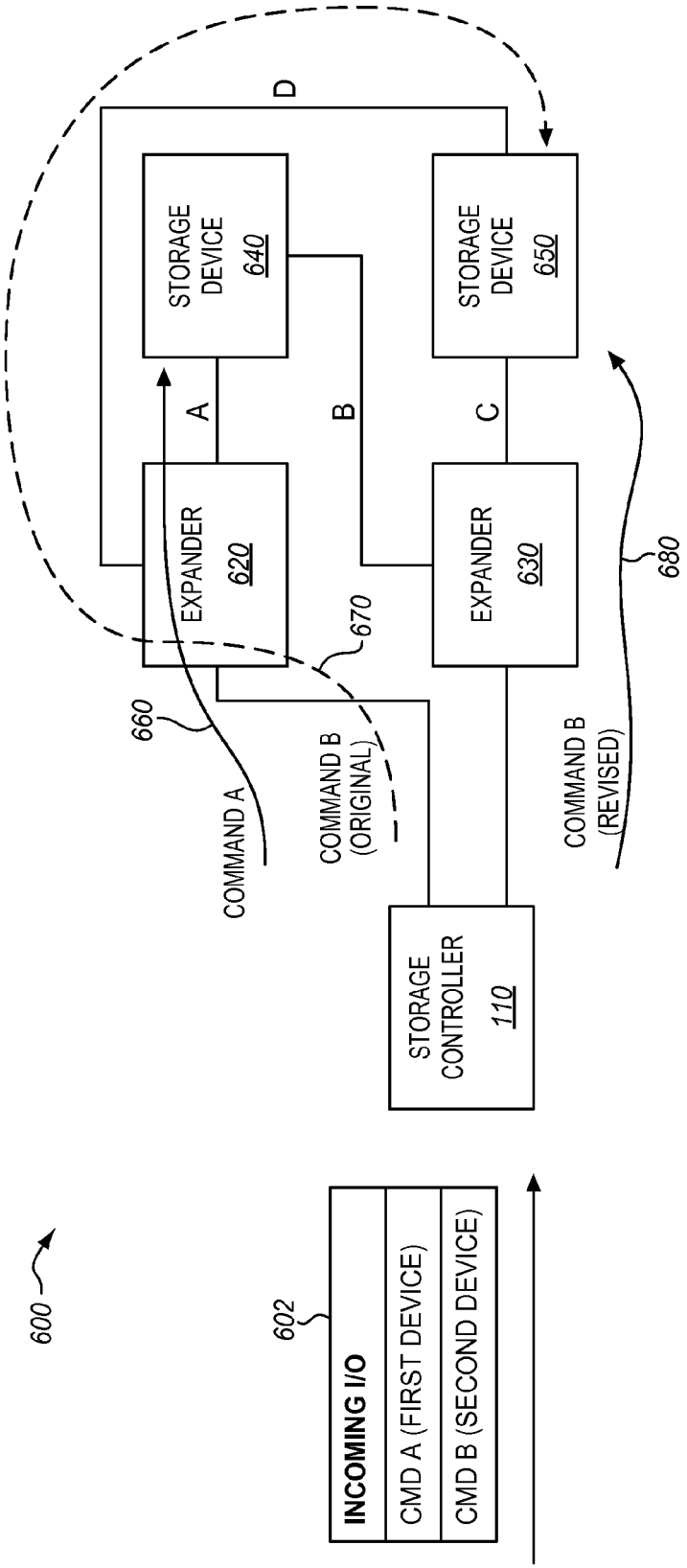
FIG. 6 is a block diagram illustrating exemplary multi-path caching of commands in a storage controller.

FIG. 6 is a block diagram 600 illustrating exemplary multi-path caching of commands in a further embodiment of storage controller 110. According to FIG. 6, cache manager 114 of storage controller 110 maintains path data. The path data indicates signaling pathways that can be used to contact devices in the storage system. For example, in this embodiment, commands directed to storage device 640 may be sent from expander 620 along pathway A, or from expander 630 along pathway B. Similarly, commands for storage device 650 may be sent from expander 620 along pathway D, or from expander 630 along pathway C.

In this embodiment, cache manager 114 of storage controller 110 evaluates cached I/O ready for transmission to storage devices 640 and 650, and attempts to enhance the speed of processing at the storage system by interleaving I/O directed to one storage device along one pathway with I/O directed to another storage device along another independent pathway that does not use any of the same path devices. For example, in FIG. 6, two I/O operations are cached in memory of storage controller 110 (commands A and B) as indicated in table 602. The commands would normally be sent out in order (e.g., A may be sent first, then B). However, commands A (as indicated by element 660) and B (as indicated by element 670) occupy the same signaling pathway since both of them will be routed through the same expander (i.e., expander 620 is shared in common by both the signaling pathways). Therefore, command B is likely to experience a delay before it is processed by expander 620, because storage expander 620 will already be processing command A when it receives command B. This means that command B is forced to wait for command A to complete before it can use the signaling pathway.

In order to address this issue, cache manager 114 of storage controller 110 selects a different signaling pathway to send command B along in order to avoid congestion along the storage system. Command A (as indicated by element 660) is therefore sent along the same signaling pathway as before, while command B (as indicated by element 680) is sent for processing along a signaling pathway that is independent from the one used for command A. Cache manager 114 may determine that cached commands are directed to the same storage expander by reviewing addressing information for the cached commands.

The process described above ensures that cache manager 114 efficiently manages multiple paths to SSDs in order to ensure better bandwidth for I/O traffic. In addition to the round robin method of selecting one among the multiple active paths to a given end device, cache manager 114 tries to determine the topology of each of the SSD devices (for instance, if all the SSDs are connected to same backplane or expander) and "manages" the active path. For instance, the active path may be toggled inversely. Each of storage devices 640 and 650 are both equally accessible from both expanders 620 and 630. When cached I/O operations are processed, the I/O operations are interleaved such that the path chosen results in even distribution of I/O load to both the expanders 620 and 630 in FIG. 6, in addition to even distribution of I/O load to both the storage devices 640 and 650. This is a 'dynamic' decision taken based on the current load (i.e., the number of I/O requests) on any given expander, at any given point in time. If cache manager 114 receives ten I/O requests for storage device 640, and ten I/O requests for storage device 650, it ensures that expander 620 receives ten commands and expander 630 receives the other ten commands.

Figure 7:
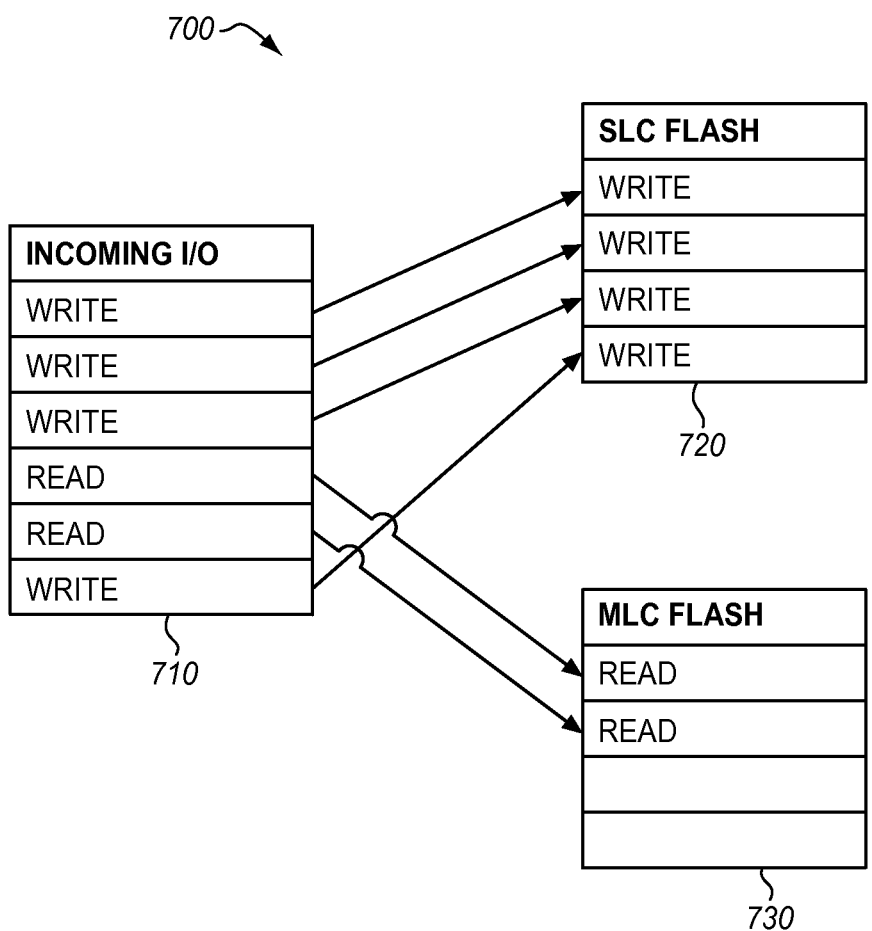
FIG. 7 is a block diagram illustrating an exemplary cache memory that includes both a Single Level Cell (SLC) SSD and a Multi-Level Cell (MLC) SSD.

FIG. 7 is a block diagram 700 illustrating an exemplary cache memory that includes both a Single Level Cell (SLC) SSD and a Multi-Level Cell (MLC) SSD. MLC SSDs tend to have shorter functional lifetimes (i.e., durability) than SLC SSDs, because MLC SSDs can experience fewer writes than SLC ones before failing. MLC SSD's also have lower performance quality than SLC SSDs. Thus, when the cache memory is implemented with an SLC SSD and an MLC SSD, incoming I/O operations may be written preferentially to one specific type of SSD.

In one embodiment as illustrated in FIG. 7, incoming I/O operations may be stored in an SLC SSD if they are primarily write operations (i.e., if they are identified as write operations), and may be stored in one or more MLC SSDs if they are primarily read operations (i.e., if they are identified as read operations). To efficiently handle the operations on MLC, the underlying data on MLC SSDs is managed as a "row" (or stripe) of data via smaller sized strips, with each strip located on a different MLC SSD. I/O's can be issued in parallel to each MLC SSD to improve the overall I/O performance on MLC SSDs. Furthermore, in one embodiment, once there is a complete row (or Stripe) of data to be written, the data is not written on the same row (or Stripe) on which the original cache mapping was done. Instead, the complete row of data is written to a new row selected from a free pool of available locations. Once a new row is selected, the current row is assigned back to the end of the free pool. In this manner, the I/O operations are distributed across all of the available MLC SSD space. This will further increase flash endurance of MLC SSDs. By selectively storing read requests in MLC SSDs, and storing write requests in an SLC SSD, the longevity and performance of the MLC SSDs can beneficially be increased.

In a further embodiment, storage controller 110 is designed to actively detect the addition or removal of new SSDs that implement the cache. Storage controller 110 further updates a list of available physical cache locations based on the addition or removal of new SSDs. For example, if a new large SSD is added to the cache of storage controller 110, then cache manager 114 updates a free block list with the blocks from the new SSD. Similarly, if cache manager 114 detects that an SSD has been removed, cache manager 114 may remove entries from the old SSD from a free block list.

In this embodiment, when a cache device is removed, storage controller 110 marks the cache device as unavailable (e.g., "REMOVE PENDING"). At this point, free cache entries for the cache device are no longer available for allocation. Therefore, data for new incoming I/O operations is excluded from the cache device, and is stored at other cache devices.

Storage controller 110 also activates a background process known as an invalidation thread once it detects that the cache device is unavailable. This thread finds all cache entries in the storage device that are currently storing data, and invalidates those cache entries. If a new I/O operation for an invalidated cache entry is received, the I/O operation can be placed on hold. In the invalidation process, if a cache entry has no data for outstanding I/O operations, the cache entry is marked as "INVALIDATION DONE," and is removed from indexing data in storage controller 110. However, if a cache entry has data for an outstanding I/O operation, then the cache entry is marked as "INVALIDATION IN PROGRESS." At this point, once the outstanding I/O operations for such cache entries have completed, these cache entries are marked as "INVALIDATION DONE."

Once a cache entry has entered the "INVALIDATION DONE" state, any I/O's relating to the cache entry that are on hold can be de-queued and re-issued to the caching layer as new I/O requests. After all the cache entries for the removed cache device are invalidated ("INVALIDATION DONE"), the cache device is moved to the "REMOVE DONE" state. After this, it can be removed from the caching configuration for storage controller 110.

In a further embodiment, for efficient processing, storage controller 110 allows I/O requests to arrive on a cache device that has just been marked "REMOVE PENDING" before the "Invalidation Thread" either starts its processing and/or before it has processed a particular cache window on which the I/O requests arrive. In this scenario, the cache window invalidation processing can be executed by the I/O request itself.

Figure 8:
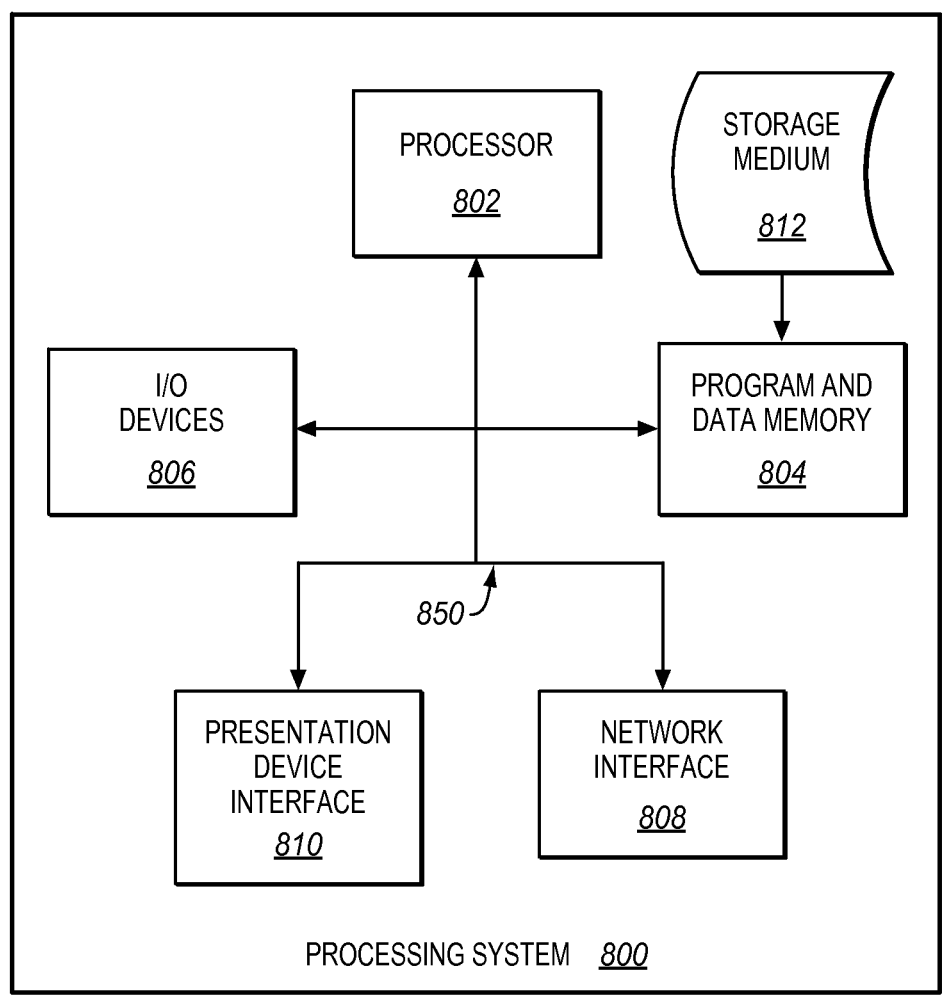
FIG. 8 is a block diagram illustrating an exemplary processing system operable to execute programmed instructions embodied on a computer readable medium.

Embodiments disclosed herein can take the form of software, hardware, firmware, or various combinations thereof. In one particular embodiment, software is used to direct a processing system of storage controller 110 to perform the various operations disclosed herein. FIG. 8 illustrates an exemplary processing system 800 operable to execute a computer readable medium embodying programmed instructions. Processing system 800 is operable to perform the above operations by executing programmed instructions tangibly embodied on computer readable storage medium 812. In this regard, embodiments of the invention can take the form of a computer program accessible via computer readable medium 812 providing program code for use by a computer or any other instruction execution system. For the purposes of this description, computer readable storage medium 812 can be anything that can contain or store the program for use by the computer.

Computer readable storage medium 812 can be an electronic, magnetic, optical, electromagnetic, infrared, or semiconductor device. Examples of computer readable storage medium 812 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 800, being suitable for storing and/or executing the program code, includes at least one processor 802 coupled to program and data memory 804 through a system bus 850. Program and data memory 804 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 806 (including but not limited to keyboards, displays, pointing devices, etc.) can be coupled either directly or through intervening I/O controllers. Network adapter interfaces 808 may also be integrated with the system to enable processing system 800 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 810 may be integrated with the system to interface to one or more presentation devices, such as printing systems and displays for presentation of presentation data generated by processor 802.

What is claimed is:

1. A storage controller of a storage system, the storage controller comprising:
   a host interface operable to receive Input/Output (I/O) operations from a host computer;
   a cache memory comprising a Solid State Drive (SSD); and
   a cache manager that is operable to determine physical locations in the SSD that are unused, to identify an unused location that was written to a longer period of time ago than other unused locations, and to store a received I/O operation in the identified physical location,
   the cache manager further operable to trigger transmission of the stored I/O operations to storage devices of the storage system for processing,
   wherein if the cache manager determines that a set of cached I/O operations are directed to different storage devices along signaling pathways that share at least one common device, the cache manager is operable to alter one of the set of cached I/O operations to indicate a new signaling pathway that does not share a common device.

2. The storage controller of claim 1, wherein:
   the cache manager is distinct from the SSD and any controller internal to the SSD.

3. The storage controller of claim 1, wherein:
   the cache manager is further operable to identify multiple I/O operations that will utilize a signaling pathway, and to interleave I/O operations that do not utilize the signaling pathway between the identified I/O operations.

4. The storage controller of claim 1, wherein:
   the storage devices implement a striped Redundant Array of Independent Disks (RAID) volume, and
   the cache manager is further operable to write each received I/O operation to the cache as one or more full stripes of RAID data.

5. The storage controller of claim 4, wherein:
   the cache memory comprises multiple SSDs, and
   the cache manager is further operable to write each block of the stripe to a different SSD.

6. The storage controller of claim 1, wherein:
   the cache comprises a Single-Level Cell (SLC) SSD and a Multi-Level Cell (MLC) SSD, and
   the cache manager is further operable to review the received I/O operation to determine whether the I/O operation is a write operation, to store the I/O operation in the MLC SSD if the I/O operation is not a write operation, and to store the I/O operation in the SLC SSD if the I/O operation is a write operation in order to increase the operational lifetime of the MLC SSD.

7. The storage controller of claim 1, wherein:
   the cache comprises multiple SSDs, and
   the cache manager is further operable to determine, while operating, that the number of SSDs implementing the cache has changed, and to update the determined set of physical locations to reflect the change.

8. A method for operating a storage controller of a storage system, the method comprising:
receiving Input/Output (I/O) operations from a host computer at a storage controller that includes a cache memory that comprises a Solid State Drive (SSD);
determining physical locations that are unused in the cache memory, via a cache manager of the storage controller;
identifying an unused location that was written to a longer period of time ago than other unused locations;
storing a received I/O operation in the identified physical location;
transmitting the stored I/O operation from the storage controller to a storage device of the storage system;
determining that a set of cached I/O operations are directed to different storage devices along signaling pathways that share at least one common device; and
altering one of the set of cached I/O operations to indicate a new signaling pathway that does not share a common device.

9. The method of claim 8, wherein:
the cache manager is distinct from the SSD and any controller internal to the SSD.

10. The method of claim 8, further comprising:
identifying multiple I/O operations that will utilize a signaling pathway; and
interleaving I/O operations that do not utilize the signaling pathway between the identified I/O operations.

11. The method of claim 8, wherein:
the storage devices implement a striped Redundant Array of Independent Disks (RAID) volume, and the method further comprises:
writing each received I/O operation to the cache as one or more full stripes of RAID data.

12. The method of claim 11, wherein:
the cache memory comprises multiple SSDs, and the method further comprises:
writing each block of the stripe to a different SSD.

13. The method of claim 8, wherein:
the cache comprises a Single-Level Cell (SLC) SSD and a Multi-Level Cell (MLC) SSD, and the method further comprises:
reviewing the received I/O operation to determine whether the I/O operation is a write operation;
storing the I/O operation in the MLC SSD if the I/O operation is not a write operation; and
storing the I/O operation in the SLC SSD if the I/O operation is a write operation in order to increase the operational lifetime of the MLC SSD.

14. The method of claim 8, wherein:
the cache comprises multiple SSDs, and the method further comprises:
determining, while actively operating the storage controller, that the number of SSDs implementing the cache has changed; and
updating the determined set of physical locations to reflect the change.

15. A non-transitory computer readable medium embodying programmed instructions which, when executed by a processor, are operable for performing a method comprising:
receiving Input/Output (I/O) operations from a host computer at a storage controller that includes a cache memory that comprises a Solid State Drive (SSD);
determining physical locations that are unused in the cache memory, via a cache manager of the storage controller;
identifying an unused location that was written to a longer period of time ago than other unused locations;
storing a received I/O operation in the identified physical location;
transmitting the stored I/O operation from the storage controller to a storage device of the storage system;
determining that a set of cached I/O operations are directed to different storage devices along signaling pathways that share at least one common device; and
altering one of the set of cached I/O operations to indicate a new signaling pathway that does not share a common device.

16. The medium of claim 15, the method wherein:
the cache manager is distinct from the SSD and any controller internal to the SSD.

17. The medium of claim 15, the method further comprising:
identifying multiple I/O operations that will utilize a signaling pathway; and
interleaving I/O operations that do not utilize the signaling pathway between the identified I/O operations.

18. The medium of claim 15, wherein:
the storage devices implement a striped Redundant Array of Independent Disks (RAID) volume, and the method further comprises:
writing each received I/O operation to the cache as one or more full stripes of RAID data.

19. The medium of claim 18, wherein:
the cache memory comprises multiple SSDs, and the method further comprises:
writing each block of the stripe to a different SSD.

20. The medium of claim 15, wherein:
the cache comprises a Single-Level Cell (SLC) SSD and a Multi-Level Cell (MLC) SSD, and the method further comprises:
reviewing the received I/O operation to determine whether the I/O operation is a write operation;
storing the I/O operation in the MLC SSD if the I/O operation is not a write operation; and
storing the I/O operation in the SLC SSD if the I/O operation is a write operation in order to increase the operational lifetime of the MLC SSD.

* * * * *